(12) United States Patent
Kadatch et al.

(10) Patent No.: US 9,069,616 B2
(45) Date of Patent: Jun. 30, 2015

(54) BANDWIDTH THROTTLING OF VIRTUAL DISKS

(75) Inventors: Andrew Kadatch, Redmond, WA (US); Sergey Khorun, Seattle, WA (US)

(73) Assignee: Google Inc., Mountain View, CA (US)

( * ) Notice: Subject to any disclaimer, the term of this patent is extended or adjusted under 35 U.S.C. 154(b) by 524 days.

(21) Appl. No.: 13/243,752

(22) Filed: Sep. 23, 2011

(65) Prior Publication Data
US 2013/0081014 A1 Mar. 28, 2013

(51) Int. Cl.
*G06F 9/455* (2006.01)
*G06F 9/50* (2006.01)

(52) U.S. Cl.
CPC ................... *G06F 9/5027* (2013.01)

(58) Field of Classification Search
CPC ........................................................ G06F 9/50
USPC ............................................................ 718/1
See application file for complete search history.

(56) References Cited

U.S. PATENT DOCUMENTS

| | | | |
|---|---|---|---|
| 5,463,768 A | 10/1995 | Cuddihy et al. | |
| 5,778,444 A | 7/1998 | Langan et al. | |
| 6,178,482 B1 | 1/2001 | Sollars | |
| 6,490,651 B1 * | 12/2002 | Shats et al. | 711/112 |
| 6,505,211 B1 | 1/2003 | Dessloch et al. | |
| 6,598,179 B1 | 7/2003 | Chirashnya et al. | |
| 6,898,697 B1 | 5/2005 | Gao et al. | |
| 7,062,718 B2 | 6/2006 | Kodosky et al. | |
| 7,117,243 B2 | 10/2006 | Peart | |
| 7,478,388 B1 | 1/2009 | Chen et al. | |
| 7,529,836 B1 | 5/2009 | Bolen | |
| 7,584,229 B2 * | 9/2009 | Moore et al. | 1/1 |
| 7,596,620 B1 | 9/2009 | Colton et al. | |
| 7,650,331 B1 | 1/2010 | Dean et al. | |
| 7,653,833 B1 | 1/2010 | Miller et al. | |
| 7,761,573 B2 | 7/2010 | Travostino et al. | |
| 7,804,862 B1 | 9/2010 | Olson et al. | |
| 7,836,285 B2 | 11/2010 | Giri et al. | |
| 8,127,295 B1 * | 2/2012 | Jones et al. | 718/104 |
| 8,146,147 B2 | 3/2012 | Litvin et al. | |
| 8,261,295 B1 | 9/2012 | Risbood et al. | |
| 8,276,140 B1 | 9/2012 | Beda et al. | |
| 2002/0091902 A1 | 7/2002 | Hirofuji | |
| 2004/0139368 A1 | 7/2004 | Austen et al. | |
| 2005/0166011 A1 | 7/2005 | Burnett et al. | |

(Continued)

OTHER PUBLICATIONS

Moller, Jan, et al., "Internal Network Security", Feb. 1,-May 18, 2001, Retrieved from the Internet: <URL: http://www.daimi.au.dk/~fwiffo/thesis/>, 183 pages.

(Continued)

*Primary Examiner* — Emerson Puente
*Assistant Examiner* — Steven Do
(74) *Attorney, Agent, or Firm* — Fish & Richardson P.C.

(57) ABSTRACT

Methods, systems, and apparatus, including computer programs encoded on a computer storage medium, for managing resources in a computing system. For virtual hard disk drives supported by multiple physic hard disk drives over a network, artificial throttling of the disk access bandwidth is implemented, such that the resulting latency behavior of each virtual hard disk drive resembles the latency behavior of a corresponding physical hard disk drive emulated by the virtual hard disk drive. In various implementations, the artificial throttling simulates both characteristics of sequential access latencies and random access latencies on a physical hard drive.

19 Claims, 6 Drawing Sheets

(56) References Cited

U.S. PATENT DOCUMENTS

| | | | |
|---|---|---|---|
| 2006/0161753 | A1 | 7/2006 | Aschoff et al. |
| 2007/0112956 | A1* | 5/2007 | Chapman et al. ............. 709/224 |
| 2007/0118694 | A1 | 5/2007 | Watanabe et al. |
| 2007/0199058 | A1 | 8/2007 | Baumgart et al. |
| 2007/0271604 | A1 | 11/2007 | Webster et al. |
| 2007/0280243 | A1 | 12/2007 | Wray et al. |
| 2008/0086515 | A1 | 4/2008 | Bai et al. |
| 2008/0205415 | A1 | 8/2008 | Morales |
| 2008/0215796 | A1 | 9/2008 | Lam et al. |
| 2008/0244471 | A1 | 10/2008 | Killian et al. |
| 2008/0270704 | A1 | 10/2008 | He et al. |
| 2009/0097657 | A1 | 4/2009 | Scheidt et al. |
| 2009/0150629 | A1 | 6/2009 | Noguchi et al. |
| 2009/0199177 | A1 | 8/2009 | Edwards et al. |
| 2009/0222815 | A1 | 9/2009 | Dake |
| 2009/0235358 | A1* | 9/2009 | Tolba ............................. 726/24 |
| 2009/0241108 | A1 | 9/2009 | Edwards et al. |
| 2009/0249440 | A1 | 10/2009 | Platt et al. |
| 2009/0276771 | A1 | 11/2009 | Nickolov et al. |
| 2009/0300605 | A1 | 12/2009 | Edwards et al. |
| 2010/0057913 | A1 | 3/2010 | Dehaan |
| 2010/0071035 | A1 | 3/2010 | Budko et al. |
| 2010/0094999 | A1 | 4/2010 | Sampangi et al. |
| 2010/0095000 | A1 | 4/2010 | Kettler et al. |
| 2010/0199089 | A1 | 8/2010 | Vysogorets et al. |
| 2010/0287548 | A1 | 11/2010 | Zhou et al. |
| 2011/0022812 | A1 | 1/2011 | van der Linden et al. |
| 2011/0055361 | A1 | 3/2011 | Dehaan |
| 2011/0060882 | A1* | 3/2011 | Efstathopoulos ............. 711/162 |
| 2011/0153838 | A1 | 6/2011 | Belkine et al. |
| 2011/0191485 | A1 | 8/2011 | Umbehocker |
| 2011/0231280 | A1 | 9/2011 | Farah |
| 2011/0258441 | A1 | 10/2011 | Ashok et al. |
| 2012/0191912 | A1 | 7/2012 | Kadatch et al. |

OTHER PUBLICATIONS

Primet, Pascale, et al.., "HIPCAL: State of the Art of OS and Network virtualization solutions for Grids", Sep. 14, 2007, 38 pages.
Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages.
Bucket Explorer. "What is my AWS Access and Secret Key." [Retrieved Apr. 26, 2011]. Retrieved from the Internet <URL: http://www.bucketexplorer.com/documentation/amazons3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL:http://onlamp.com/pub/a/onlamp/2008/05/13/creating-applications-with-amazon-ec2-ands3.html>, 8 pages.
Wikipedia. "OAuth." [online], Dec. 12, 2010; [Retrieved on Jan. 20, 2011] Retrieved from the Internet <URL: http://en.wikipedia.orq/wiki/OAuth>; 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling-Getting Started Guide-API Version Aug. 1, 2010. Amazon Web Services LLC, 2010, 20 pages.
Amazon Auto Scaling- Developer Guide- API Version Aug. 1, 2010. Amazon Web Services LLC, 2011, 62 pages.
Amazon CloudWatch-Developer Guide-API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoringlinux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDGchapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.

(56) References Cited

OTHER PUBLICATIONS

"IPsec". Creativecommons.org [online]. Creative Commons Attribution-Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.
"Generic Routing Encapsulation". Creativecommons.org [online]. Creative Commons Attribution-Share Alike 3.0 Unported, Nov. 12, 2010; [Retrieved on Jan. 14, 2011]; Retrieved from the Internet: <URL: http://en.wikipedia.org/w/index.php?oldid=396280384>; pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange. com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL:http://blog.tag-gesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
L. Gommans, et al., Token-Based Authorization of Connection Oriented Network Resources, 1st International Workshop on Networks for Grid Applications (Grid Nets 2004), Oct. 29, 2004; 8 pages.
Hyun, Ahn Ji, Authorized Officer for Korean Intellectual Property Office, International Search Report and Written Opinion for PCT/US2012/021846, International Search Report completed May 25, 2012, 8 pages.
Na, Lee Da, Authorized Officer for Korean Intellectual Property Office, International Search Report and Written Opinion for PCT/US2012/020954, International Search Report completed Aug. 23, 2012, 10 pages.
Alpern, B., "The Jalapeno virtual machine," IBM Systems Journal, 2000, vol. 39, Issue 1, pp. 211-238.
Bok, Jin Yo, Authorized Officer for Korean Intellectual Property Office, International Search Report and Written Opinion for PCT/US2012/029210, International Search Report completed Oct. 10, 2012, 2 pages.
Anonymous, Storage I/O Control Technical Overview and Consideration for Deployment VMware vSphere™ 4.1, Jan. 1, 2010, XP05504491, retrieved from the internet: URL:http://www.vmware.com/fled/pdf/techpaper/WMW-vSphere41-SIOC.pdf; [retrieved on Nov. 21, 2012], the entire document.
International Search Report and Written Opinion in International Application No. PCT/US2012/056683, mailed Dec. 12, 2012, 15 pages.

* cited by examiner

BANDWIDTH THROTTLING OF VIRTUAL DISKS

BACKGROUND

This specification relates to managing system resources.

Cloud-computing is network-based computing in which collections of servers housed in data centers provide computational resources and data storage as needed to remote end users. Some cloud-computing service providers provide virtual machines hosted on one or more servers to end users and allow the end users to install and execute software applications on the virtual machines. Some cloud-computing service providers also provide access to software applications to end users through web servers running on one or more virtual machines.

A virtual machine is a software process executing on a physical host machine (e.g., a cloud-computing server). The virtual machine emulates a physical computer that can execute other software programs and access physical and/or virtual resources provided to the virtual machine through the host machine. The physical and virtual resources available to the host machine can be shared among multiple virtual machines launched on the host machine. In some implementations, a virtual machine can be assigned one or more virtual disks for data storage. Each virtual disk of the virtual machine emulates a physical hard disk drive (HDD) in terms of input/output (I/O) access operations with respect to the virtual machine. A cloud-service provider can employ different types of underlying hardware and software infrastructures to provide virtual disks for virtual machines.

SUMMARY

This specification describes technologies relating to managing resources in a computing system.

In general, one innovative aspect of the subject matter described in this specification can be embodied in methods that include the actions of: providing access to a plurality of virtual disks, the plurality of virtual disks being hosted on a plurality of underlying physical storage devices managed by one or more servers; deriving a simulated latency cost for each disk access request received for each of the plurality of virtual disks according to one or more latency and throughput characteristics of a local physical disk emulated by the virtual disk; and controlling a promptness by which respective requested disk accesses for each of the plurality of virtual disks are executed on the plurality of underlying physical storage devices according to a comparison between the simulated latency costs of the respective requested disk accesses and a simulated disk access capacity of the local physical disk emulated by the virtual disk.

In general, another innovative aspect of the subject matter described in this specification can be embodied in methods that include the actions of: receiving a first disk access request for disk input/output (I/O) access on a virtual disk of a virtual machine, the virtual disk emulating a local physical disk for the virtual machine; deriving a simulated latency cost for the requested disk I/O access according to one or more latency and throughput characteristics of the local physical disk emulated by the virtual disk, the simulated latency cost including a simulated data transfer latency and a simulated random access latency for carrying out the requested disk I/O access on the local physical disk emulated by the virtual disk; and determining whether to delay execution of the requested disk I/O access based on a comparison between the simulated latency cost and a current value of a disk access service quota allotted to the virtual disk, wherein the current value of the disk access service quota is replenished over time, is capped at a predetermined cap value, and is decreased by a respective simulated latency cost of each previous disk access request for the virtual disk when respective requested disk I/O access of the previous disk access request was carried out.

These and other embodiments can each optionally include one or more of the following features.

In some implementations, the virtual disk includes logical data blocks that map to physical data blocks distributed among multiple physical storage devices.

In some implementations, the actions further include: carrying out requested I/O accesses for multiple disk access requests in parallel on the multiple physical storage devices, provided that the current value of the disk access quota is above a sum of respective simulated latency costs of the multiple disk access requests.

In some implementations, the virtual disk is one of a plurality of virtual disks hosted on the multiple physical storage devices, and the actions further include: for each of the plurality of virtual disks: incrementing a respective disk access service quota of the virtual disk according to a predetermined replenish rate associated with the virtual disk until a current value of the respective disk access service quota reaches a respective predetermined cap value associated with the virtual disk; and temporarily pausing the incrementing until the current value of the respective disk access service quota of the virtual disk falls below the respective predetermined cap value associated with the virtual disk.

In some implementations, the actions further include: keeping a record of respective end positions of one or more previous disk access requests for the virtual disk that were received during a predetermined time interval immediately prior to a current time; and calculating the simulated random access latency for the requested disk I/O access of the first disk access request based at least on a seek distance between a start position of the requested disk I/O access and a nearest end position among the respective end positions of the one or more previous disk access requests.

In some implementations, the actions further include: (1) upon determination that the simulated latency cost of the first disk access request is at or below the current value of the disk access service quota allotted to the virtual disk: carrying out the requested disk I/O access of the first disk access request; and deducting the simulated latency cost of the requested I/O access from the current value of the disk service access quota allotted to the virtual disk; and (2) upon determination that the simulated latency cost of the first disk access request exceeds the current value of the disk access service quota allotted to the virtual disk: queuing the first disk access request until the current value of the disk service access quota has reached at or above the simulated latency cost of the first disk access request through scheduled replenishing.

In some implementations, the actions further include: monitoring response time for respective disk access requests for a plurality of virtual disks that share a plurality of underlying physical storage devices; monitoring utilization level of a disk access capacity of the plurality of underlying physical storage devices; and adjusting one or more of a group of predetermined parameters, the group of predetermined parameters including replenish rates and cap values of respective disk access service quotas of the plurality of virtual disks and one or more predetermined values used in calculating the simulated latency cost of the requested disk I/O access.

Particular embodiments of the subject matter described in this specification can be implemented so as to realize one or more of the following advantages.

In some implementations, disk access to a virtual disk is throttled according to the latency and throughput characteristics of a physical hard disk drive emulated by the virtual disk. Many existing software applications installed on virtual machines are optimized for computer systems attached to physical hard disk drives. By artificially throttling disk access to the virtual disks in a manner that simulates the access latency characteristics of physical hard disk drives, the existing disk access optimizations implemented in the software applications can work as originally designed to improve user experience.

In some implementations, resources (e.g., storage and network resources) needed to support I/O access to virtual disks are shared among multiple virtual disks of multiple virtual machines. Stable service levels and fair sharing of the resources may be compromised when some of the virtual machines take advantage of the disk access latency characteristics of the cloud-based virtual disks at the expense of other virtual machines. By artificially limiting the disk access capacities of the cloud-based virtual disks according to the latency and throughput characteristics of physical hard disk drives, the disk access service levels of the virtual disks can be maintained at a stable level. The stable service level can lead to a better user experience. Large latencies and unpredicted disruptions in access to the virtual disks due to unfair sharing of disk access resources can be reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
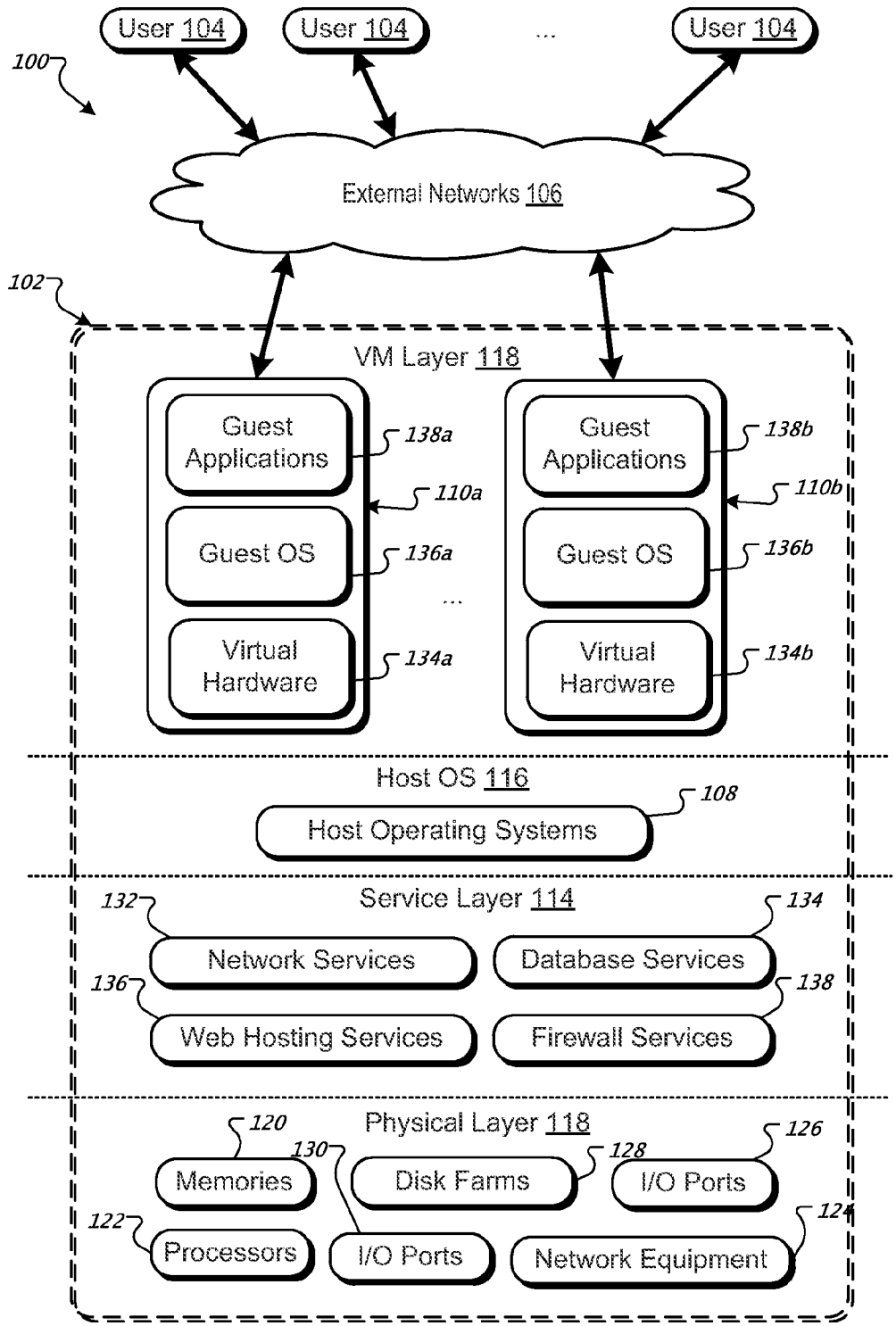
FIG. 1 illustrates an example system hosting multiple virtual machines.

FIG. 1 is a schematic illustration of an example cloud-computing environment 100. The cloud-computing environment 100 includes one or more host machines 102 of a cloud-computing service provider. The one or more host machines 102 provide cloud-based services, such as software services, platform services, and framework services, to end users 104 through one or more networks 106. The cloud-based services can be dynamically provisioned, suspended, and/or removed, on an as-needed basis on the host machines 102.

Generally, a host machine 102 is one or more data processing apparatus such as a rack mounted server or other computing devices. The data processing apparatus of a host machine 102 can reside at different physical locations and can have different capabilities and computer architectures. Multiple host machines 102 can communicate with each other through one or more internal data communications networks (not shown) of the cloud-service provider. The host machines 102 can also communicate with devices on external networks, such as the Internet.

Each host machine 102 can execute a host operating system 108 or other software that virtualizes the underlying host machine hardware and manages the concurrent execution of one or more virtual machines 110. In addition, one or more host machines 102 can provide various services and/or virtualized hardware resources that are sharable among multiple other host machines 102 and/or virtual machines 110. In some implementations, a host machine 102 can access hardware resources and/or virtual resources, such as physical data storage devices and/or virtual storage devices, through one or more networks (e.g., one or more internal networks and/or the Internet).

For example, as shown in FIG. 1, the one or more host machines 102 of the cloud-computing service provider can be conceptually represented as a system having a physical layer 112, a service layer 110, a host operating system (OS) layer 116, and a virtual machine layer 118. The physical layer 112 includes hardware and firmware resources of the host machines 102, including memory, processors, network equipment, I/O ports, data storage devices, I/O devices, for example. In some implementations, the physical layer includes physical resources (e.g., hard disk drives) that are accessible to the host machines 102 through one or more networks and need not be locally attached to the data processing apparatuses of the host machines 102. The service layer 114 includes services made available to the host machines 102, for example, through one or more dedicated machines and processes of the cloud-computing service provider. These services include network services 132, database services 134, web hosting services 136, firewall services 138, for example. The virtual machine layer 118 includes virtual machines 110 that are used to provide the cloud-based services to the end users 104. The host OS layer 116 includes host operating systems 108 that manage the virtual machines 110 in the virtual machine layer 118. The host operating systems 108 also facilitate access to the services in the service layer 114 and physical resources in the physical layer 112 by the virtual machines 110.

In some implementations, a host operating system 108 of a host machine 102 can launch and manage a single virtual machine 110 or multiple virtual machines 110 (e.g., virtual machines 110a and 110b). Each virtual machine 110 is a software process executing in the host operating system 108 and emulates the underlying host machine hardware or another computer architecture. The version of the machine hardware emulated by the virtual machine process is referred to as virtual hardware 134 (e.g., virtual hardware 134a and 134b). The virtual hardware 134 of a virtual machine 110 includes, for example, virtual memory, one or more virtual processors, and one or more virtual hard disk drives (also referred to as "virtual disks").

In some implementations, virtual hardware 134 of a virtual machine 110 can map directly to one or more physical devices of a host machine 102. In some implementations, the virtual hardware 134 of a virtual machine 110 can map to one or more virtualized devices that are provided to the host machine 102 by other host machines through one or more networks. In some implementations, the virtual hardware 134 of the virtual machine 110 can map to one or more physical devices that are not locally attached to the data processing apparatuses of the host machines 102, but are accessible to the data processing apparatuses of the host machines 102 through one or more networks.

For example, a virtual machine 110 can be allocated a set of virtual memory pages from the virtual memory of the underlying host operating system 108. In addition, the virtual machine 110 can be allocated virtual disk blocks (e.g., on one or more virtual disks) from one or more physical storage devices of the underlying host machine 102, including one or more physical hard disk drives locally attached to the host machine 102 or accessible by the host machine 102 through one or more networks. Each logical data block on a virtual disk can map to a respective physical data block on a physical data storage device.

In some implementations, the host machines 102 of the cloud-computing service provider can provision a large number of virtual disks using multiple physical storage devices housed in data centers. The logical data blocks of each virtual disk may map to physical data blocks distributed among multiple physical storage devices. At the same time, logical data blocks of multiple virtual disks may map to the physical data blocks on the same physical storage device. The host machines 102 can intercept disk access requests made to the virtual disks by virtual machines and/or other processes. The host machines 102 can then perform the requested disk accesses on the physical data storage devices underlying the virtual disks on behalf of the requesting virtual machines and/or processes. In some implementations, the host machines 102 carry out the data communication with the underlying physical data storage devices through one or more internal networks and/or intermediate servers of the cloud service provider.

In general, software that is executed by the virtual hardware 134 of a virtual machine 110 is referred to as guest software. In many cases, the guest software cannot determine if it is being executed on the virtual hardware 134 or on a physical host machine 102. A virtual machine 110's guest software can include a guest operating system 136 (e.g., guest OS 136a and guest OS 136b) which is software that controls the execution of respective guest software applications 138 (e.g., guest applications 138a and 138b) within the virtual machine 110. The guest operating system 136 also provides services, such as network services, I/O services, network services, and so on, to the guest applications 138. In some implementations, a virtual machine 110 does not require a guest operating system 136 in order to execute guest software applications 138. In some implementations, a guest operating system 136's access to resources such as networks and data storage is controlled by the underlying host operating system 108.

By way of illustration, and with reference to the virtual machine 116a, when the guest application 138a or the guest operating system 136a attempts to perform an I/O operation on a virtual disk of the virtual machine 110a, the guest application 138a or the guest operating system 136a issues a disk access request to the virtual disk. The disk access request specifies the start position of the requested disk access operation and the size or range of the data transfer involved in the requested disk access operation. The start position of the requested disk access operation can be an identifier of a logical data block on the virtual disk.

When the host operating system 108 hosting the virtual machine 110a detects the disk access request issued by the guest application 138a or the guest operating system 136a, the host operating system 108 intercepts the disk access request and performs the requested disk access on behalf of the virtual machine 116a on the physical storage device underlying the virtual disk. In some implementations, the host operating system 108 of the virtual machine 110a can identify the physical data blocks on the underlying physical storage devices that map to the logical data blocks of the virtual disk and perform the requested I/O access on the physical data blocks directly. In some implementations, the host operating system 108 of the virtual machine 110a can forward the disk access request to another server that manages disk access to the virtual disk along with many other virtual disks.

As set forth earlier, in some implementations, a cloud-computing service provider can utilize different types of hardware and software infrastructures to provide data storage, including virtual disks, needed by the virtual machines. A single virtual disk of a virtual machine can be distributed among multiple hard disk drives located at the same or different geographical locations. In general, multiple consecutive requested I/O accesses to a physical hard disk drive can only be carried out serially, e.g., according to the order by which the I/O requests are received by the hard disk drive. In contrast, multiple consecutive requested I/O accesses to a virtual disk emulating the physical hard disk drive may be carried out in parallel when the accesses are for data blocks distributed on different storage devices in the physical layer underlying the virtual disk. Therefore, when no artificial throttling of the virtual disk is implemented, the latency and throughput characteristics of the virtual disk can be quite different from the latency and throughput characteristics of the physical disk emulated by the virtual disk.

More specifically, for a physical hard disk drive, sequential disk access and random disk access have different latency and throughput characteristics. A requested I/O access on a physical disk is considered sequential to an immediately preceding I/O access performed on the physical disk when the start location of the later I/O access is adjacent to (or within a predetermined short distance from) the end location of the earlier I/O access. A requested I/O access is considered a random access when the start location of the requested I/O access is not adjacent to (or outside a predetermined short distance from) the end location of the immediately preceding I/O access performed on the physical disk. As outlined below, a random access is generally more time consuming than a sequential access when the amount of data transfer involved in the two accesses are the same.

The latency of a sequential disk I/O access includes a data transfer latency and a small processing overhead latency. The data transfer latency depends mainly on the amount of data transfer involved in the requested disk access. Compared to a sequential access, a random access further includes a random access latency. The random access latency is based on the time needed to physically move and position the reading head of the physical disk over the physical disk block on a data storage medium (e.g., a magnetic disk platter) of the physical disk. Depending on the initial position of the reading head (e.g., the end position of the immediately preceding I/O access) at the time that the random access is carried out, the time used to move and position the reading head over to the start location of the random access can vary.

The exact relationship between the random access latency of a requested I/O access on a physical storage device and the relative positions between the start location of the requested I/O access and the end location of the initial location of the reading head (e.g., the end location of the immediately preceding I/O access) depends on the physical and mechanical structure of the storage device. In general, the random access latency of a physical disk includes, for example, the time to linearly move the reading head to the desired track on a disk platter (the so-called "seek latency") and the time to rotate the disk platter such that the desired disk sector settles below the reading head (the so-called "rotational latency").

The disk access capacity or throughput of a physical disk depends on the types of disk access requests that have been received for the physical disk. For example, in an example physical disk with an average data transfer rate of 100 megabytes per second, an average seek latency of 9 milliseconds, and an average rotational latency of 4.2 milliseconds, the disk access capacity is approximately 100 random I/O access requests per second for small data blocks, or 100 megabytes of data transfer per second for sequential I/O access requests. In practice, the disk access capacity is somewhere in between the two extremes, when a combination of sequential and random access requests are received.

As set forth earlier, in some implementations, a virtual disk can be provided on multiple underlying physical data storage devices, such that different data locations on the virtual disk are distributed on different physical data storage devices. When the host operating system executes the requested disk accesses on the different physical disks on behalf of the virtual machine or process that issued the disk access requests, some of these disk access requests can be carried out in parallel, provided that the access locations are distributed on different physical devices. Therefore, the access latency and throughput characteristics of a virtual disk can be different from the access latency and throughput characteristics of a physical disk emulated by the virtual disk, especially when multiple random access requests for the virtual disk are received within a short amount of time.

Also as set forth earlier, a cloud service provider generally has infrastructure for allocating many virtual disks using a large number of physical data storage devices (e.g., hard disks in one or more disk farms). The logical data blocks of each virtual disk can be mapped to physical data blocks of the multiple physical disks. In addition, each physical disk can provide some or all of the logical data blocks of multiple virtual disks. When the host operating system receives disk access requests from multiple virtual machines for accessing multiple virtual disks, the host operating system determines how to route the access requests to the physical storage devices or other intermediate servers that manage the physical storage devices. The access latency and throughput of the requested accesses can vary depending on the bandwidth of the networks that are utilized in transferring data to and from the physical storage devices, as well as how the access locations are distributed on the physical storage devices.

Sometimes, when many random access requests for accessing a single virtual disk is received in a short amount of time, these requests can be carried out in parallel because the access locations are distributed on different physical disks. These parallel executions can take up much of the disk access resources (e.g., server processing power and network bandwidth), and prevent or delay accesses to other virtual disks served by the same set of physical devices and resources.

Due to the above latency and throughput characteristics of virtual disks, sometimes, a virtual machine client can issue disk access requests in a pattern that unfairly take advantage of the disk access capacity provided by the host machines at the expense of other virtual machines. Sometimes, a virtual machine client would find its requested accesses being carried out very quickly, while other times, the requested accesses can be blocked for an extended period of time by other virtual machines that happen to have taken over much of the disk access resources earlier. Therefore, the latency and throughput characteristics of virtual disks without the artificial throttling described in this specification can lead to unpredictability in the disk access service levels. This unpredictability can cause unsatisfactory user experience for the users.

As described in this specification, artificially throttling of the virtual disk access bandwidth is implemented to prevent a small number of virtual machine clients from overwhelming the disk access resources provided by the cloud-computing server, for example, by issuing a large number of random access requests to a virtual disk distributed on multiple devices in the underlying physical layer. In some implementations, the artificial throttling is implemented by restricting the disk access service level available to each virtual disk to a predetermined fraction of the total disk access capacity the underlying physical layer is capable of providing.

For example, the restriction on the disk access capacity for each virtual disk can be implemented as a disk access quota. A respective latency cost is deducted from the current value of the disk access quota when each disk access request for the virtual disk is received and processed by the host machine on behalf of a requesting virtual machine. The disk access quota is also replenished overtime, e.g., at a predetermined replenish rate, such that the virtual machine can regain the ability to access its virtual disk after a wait period if the virtual machine had used up all of its disk access quota in a short amount of time. The replenishing is temporarily suspended when the current value of the disk access quota reaches a predetermined maximum value (or a cap value) for the disk access quota.

In some implementations, the amount deduction taken from the current value of the disk access quota of a virtual disk for each disk access request can be based on the latency and throughput characteristics of a physical disk emulated by the virtual disk.

For example, the amount of deduction can be represented by a simulated latency cost of the requested disk access as if the requested disk access were performed on the physical disk emulated by the virtual disk. In some implementations, the simulated latency cost includes a simulated data transfer latency based on the amount of data transfer involved in the requested access. The simulated latency cost can further include a random access cost that is based on the relative distance or positions between the start location of the requested access and the end location of an immediately preceding disk access request on the physical disk emulated by the virtual disk. In some implementations, one or more other latency components (e.g., the overhead latency) that are specific to the particular latency and throughput characteristics of the physical disk emulated by the virtual disk can be added to the simulated latency cost as well. More details on the calculation of the simulated latency cost are provided later in the specification with respect to FIG. 6.

Based on the techniques described in this specification, individual virtual machines are given some flexibility in choosing how to utilize the disk access quotas allotted to its virtual disks based on the virtual machine's particular data access needs at different times. A virtual machine may modify its behavior (e.g., through disk access optimizations implemented in the software applications installed on the virtual machine) such that the flow of disk access requests better utilizes the disk access quotas allotted to the virtual disks. The virtual machine may choose to use up all or most of its quota in a burst of many small random access requests during a short period of time to deal with urgent issues or a sharp rise in usage demands. The virtual machine may also choose to generate a steady flow of mixed sequential access requests and random access requests over a longer period of time.

Nonetheless, due to the limits set by the replenish rate and maximum value of the disk access quota, and the simulated latency costs attributed to the sequential and random disk accesses, the individual behaviors of each virtual machine with respect to its respective virtual disks will have little impact on the overall service levels provided to other virtual machines with respect to their respective virtual disks. Thus, a steady service level can be maintained for each virtual disk provided by the host machine, and unpredictable delays and outages of disk access services for the virtual disks can be avoided or reduced.

Figure 2:
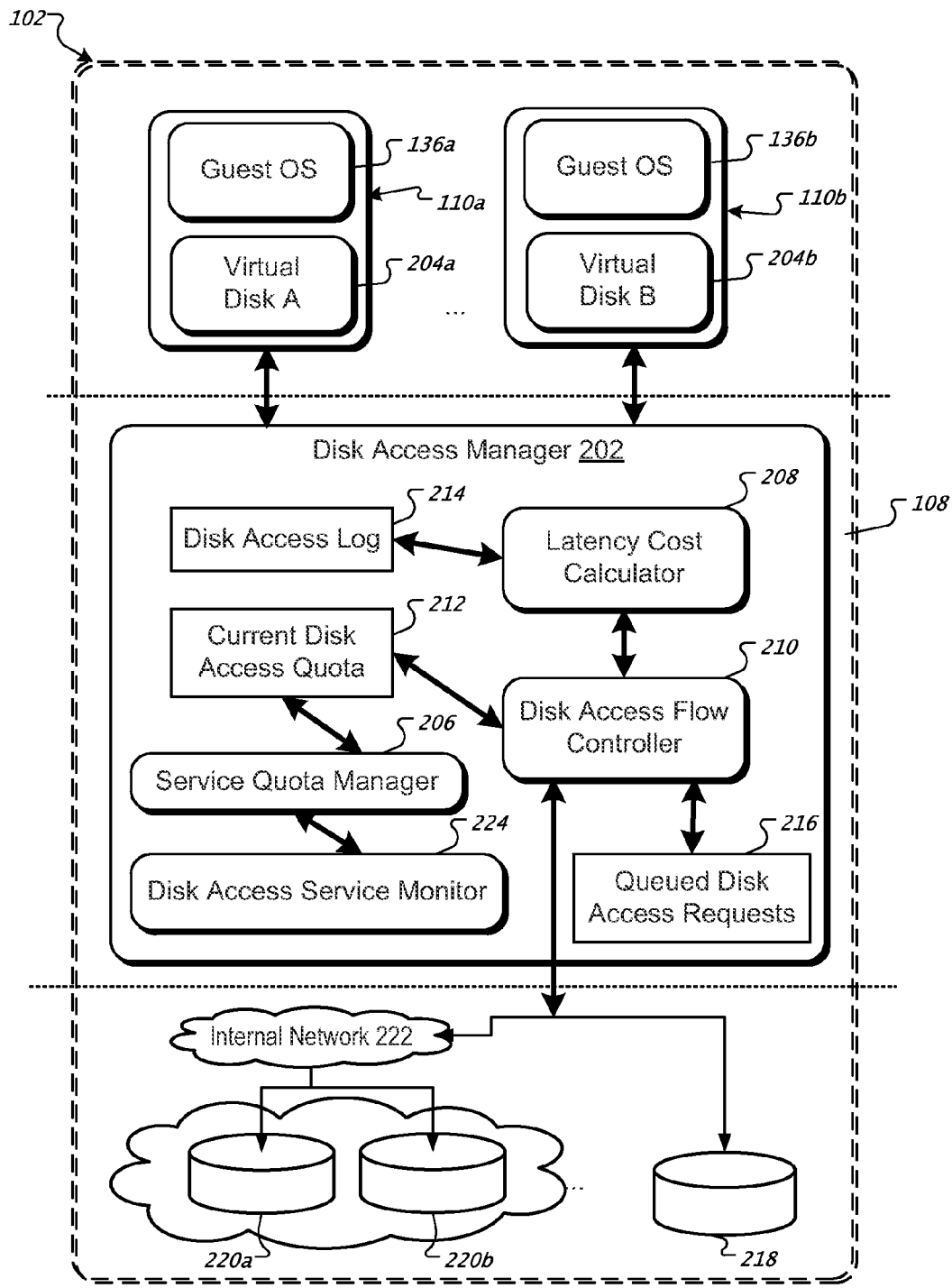
FIG. 2 illustrates an example service manager for controlling access to multiple virtual disks by multiple virtual machines.

In some implementations, resource management in a host machine or multiple host machines (e.g., host machines 102 in FIG. 1) of a cloud service provider can be provided by one or more resource managing processes executing in the host machine operating systems (e.g., the host OS 108 in FIG. 1). FIG. 2 illustrates an example resource manager (e.g., a disk access manager 202) for managing disk accesses to virtual disks provided by the host machines 102. The example disk access manager 202 implements the artificial throttling of virtual disks described in this specification. In some implementations, each virtual machine 110 can have its own disk access manager implementing the artificial throttling of the virtual machine's virtual disk accesses. In some implementations, a disk access manager can manage the virtual disk accesses of multiple virtual machines 110 (e.g., multiple virtual machines hosted by the same host machine 102, or multiple virtual machines hosted by more than one host machines 102).

As shown in FIG. 2, the host machines 102 host multiple virtual machines 110. Each virtual machine 110 is attached to one or more virtual disks 204 and has a guest operating system 136 installed on the virtual machine 110. In general, the resource manager of the host machines 102 also allocates other physical and virtual resources to the virtual machine 110 in various configurations.

As an illustrative example, when a virtual machine 110a initiates an I/O request to an attached virtual disk 204a of the virtual machine 110a, the disk access manager 202 intercepts the I/O request, and identifies one or more physical devices underlying the virtual disk 110a according to the start location and the data access range specified in the received disk I/O request. As set forth earlier, the execution of disk access requests on the single virtual disk 110a may be carried out in parallel if the requested I/O can be carried out on different physical disks in the physical layer. However, the timing of carrying out the requested disk accesses is modified according to the artificial throttling implemented by the disk access manager 202. In some implementations, the throttling is implemented to simulate the latency and throughput behaviors of a physical disk emulated by each of the virtual disks managed by the disk access manager 202.

In some implementations, as shown in FIG. 2, the disk access manager 202 of the host machines 102 includes a service quota manager 206, a latency cost calculator 208, and a disk access flow controller 210. The service quota manager 206 controls the disk access service level allocated to the virtual disk 204a, along with the disk access service levels allocated to other virtual disks managed by the host machines 102. In some implementations, the service quota manager 206 sets the maximum value (or cap value) for the disk access quota allotted to a virtual disk at any given time. The maximum value of the disk access quota set for each virtual disk can be a fraction of the total disk access capacity of the host machine 102, so that no single virtual machine can overwhelm all of the disk access capacity at any time. The total disk access capacity of the host machine 102 can include the disk access capacity provided by the locally attached physical resources of the host machine 102, the physical resources made available to the host machine 102 through one or more networks by other servers of the cloud-service provider, and/or the combination of both of the above.

In some implementations, the maximum value of the disk access quota allocated for each virtual disk can depend on the number of virtual disks that are hosted by the host machines 102. The maximum values of the disk access quotas of the virtual disks can be set such that the maximum values in aggregate do not exceed the total disk access capacity of the host machines 102. In some implementations, the maximum values of the disk access quotas of the virtual disks can be set at a level such that the maximum values in aggregate do exceed the total disk access capacity of the host machines 102. However, in such implementations, some level of throttling would still take effect, since, unlike in the un-throttled scenario, the maximum value of the disk access quota for each virtual disk is still below the full disk access capacity of the host machines 102.

In some implementations, the service quota manager 206 maintains the disk access quota of a virtual disk in the form of a "token bucket." The current value of the disk access service quota for each virtual disk is reflected by the number of tokens remaining in the "token bucket." When a requested disk access for the virtual disk is processed and executed, a certain amount of service quota is deducted from the current value of the disk access quota. In other words, a certain number of tokens are removed from the "token bucket" of the virtual disk.

In addition to removing tokens from the "token bucket" of the virtual disk, the service quota manager 206 also replenishes the "token bucket" of the virtual disk over time according to a predetermined replenish rate. For example, a predetermined number of tokens can be added to the "token bucket" of each virtual disk at regular intervals (e.g., every second). Since the disk access service quota of each virtual disk is capped at a predetermined maximum value, if the virtual disk has not been accessed for a while, and the current value of the service quota reaches to the maximum value as a result of the regular replenishing, the service quota manager 206 can temporarily stop replenishing the "token bucket" until the virtual disk has been accessed again and the quota level has dropped below the maximum level.

In some implementations, the service quota manager 206 keeps a record 212 of the current value of the disk access quota for each virtual disk 204 of each virtual machine 110 managed by the disk access manager 202. The current value of the disk access quota of each virtual disk can be utilized by the disk access flow controller 210 when determining whether to delay execution of a received disk access request for the virtual disk.

In some implementations, the maximum value of the disk access quota allotted to each virtual disk 204 can be the same for all virtual disks managed by the disk access manager 202. In some implementations, some cloud-service users can pay a premium to obtain a higher cap value for the disk access quota allotted to its virtual disks. In some implementations, the cap values of the disk access quotas can be kept constant for an extended period of time. In some implementations, the cap values of the disk access quotas may be adjusted from time to time to improve the efficiency and performance of the virtual disks.

As shown in FIG. 2, the disk access manager 202 also includes a latency cost calculator 208. The latency cost calculator 208 determines a latency cost for each disk access request received for each virtual disk 204. The amount of tokens equivalent to the latency cost can be deducted from the "token bucket" of the virtual disk when the disk access request is executed. If there are insufficient amount of tokens in the "token bucket" of the virtual disk, the execution of the request is delayed until the "token bucket" of the virtual disk has been replenished to a level at or above the latency cost of the request.

In some implementations, the latency cost calculated for each disk access request is a simulated latency cost based on the latency and throughput characteristics of a physical disk emulated by the virtual disk. The simulated latency cost does not have to be exactly equal to the latency that would have been incurred on a physical disk. Nonetheless, the simulated latency cost is calculated according to a formula that takes into account of the latency characteristics of random accesses on a physical disk.

As set forth earlier, the random access latency of a requested access on a physical disk depends on the relative positions of the start location of the current requested access and the initial location of the reading head when the request is received. The initial location of the reading head when the disk access request is received can be the home resting position of the reading head, or the end position of the immediately preceding disk access that was completed.

In some implementations, the disk access manager 202 keeps a log 214 of the completed disk accesses on each virtual disk 204 including the respective end locations of the completed disk accesses. The latency cost calculator 208 can use the information in the log 214 to identify the end location of an immediately preceding disk access for a newly received disk access request, and calculate the random access cost accordingly.

In some implementations, the log 214 only includes the end location of the last access for each virtual disk for a short period of time, e.g., a look-back time=500 milliseconds. If no access was performed on the virtual disk during the look-back time, the random access cost for the current access request is set to zero. In addition, if the current requested access has a start location that overlaps with (or is within a predetermined short distance from) the end location of the immediately preceding access on the virtual disk, the current requested access is considered a sequential access request, and the random access cost for the current requested access is also set to zero.

In some implementations, the disk access manager 202 can keep a log of all the access requests received during the look-back time window. The latency cost calculator 208 can identify, among the access requests logged during the look-back time, an access request having an end location that is closest to the start location of the current access request. The latency cost calculator 208 can use the identified access request as the immediately preceding access request for the current access request. The latency cost calculator 208 can then use the end position of the identified access request in determining whether the current access request is a sequential or random access request.

In some implementations, if a current disk access request is classified as a random access (e.g., when the seek distance D between the start location of the current access request and the end location of the immediately preceding access request is greater than the predetermined short distance, e.g., a predetermined "min_random_IO_distance" parameter), the random access cost K can be calculated based on a formula K=penalty_distance*penalty_cost+fixed_random_access_cost. In some implementations, the "penalty_distance" can be equal to the seek distance D. In some implementations, the "penalty_distance" can be equal to the lesser of the seek distance D and a predetermined maximum penalty distance "max_penalty_distance". The "penalty_cost" can be a predetermined parameter that is used to reflect the average latency for a unit seek distance. The "fixed_random_access_cost" is a predetermined parameter that reflects the average rotational latency in a physical disk emulated by the virtual disk.

The above formula used in calculating the simulated random access latency for the requested disk access is merely an example. Other functions and parameters that better simulate the random access latency on a physical disk emulated by the virtual disk are possible. The predetermined parameters used in the formula for calculating the simulated random access latency of the requested disk access on a virtual disk can be chosen such that the simulated random access latency calculated according to the formula better match closely to the actual random access latency that would be incurred on an actual physical disk emulated by the virtual disk.

In addition to the random access cost (e.g., the simulated random access latency) of a received disk access request, the latency cost calculator 208 also determines a data transfer latency for the disk access request. The data transfer latency is calculated based on the amount of data transfer involved in the requested data access. The data transfer rate is a predetermined parameter that can be based on the actual data transfer rate of a physical disk emulated by the virtual disk. The data transfer rate may also deviate from the actual data transfer rate of a physical disk emulated by the virtual disk, in some implementations. For example, the data transfer rate can be a tunable parameter that is based on the data transfer capacity or network bandwidth of the underlying physical layer of the virtual disks.

In some implementations, in addition to the data transfer latency and random access cost, the latency cost of a requested disk access can also include one or more other components, such as a fixed or variable overhead latency component. The overhead latency component can be a predetermined value that reflects to the overhead latency of the physical disk emulated by the virtual disk, for example.

After the latency cost of a received disk access request for a virtual disk is determined by the latency cost calculator 208, the simulated latency cost can be passed to the disk access flow controller 210, along with the current value of the disk access service quota of the virtual disk. The disk access flow controller 210 compares the latency cost of the requested access and the current value of the disk access service quota for the virtual disk. Based on the comparison, the disk access flow controller 210 and determines whether the requested access will be carried out immediately. If there are not enough disk access tokens in the "token bucket" of the virtual disk, the request can be placed in a queue 216 and retried later (e.g., after a predetermined delay period).

In some implementations, the amount of delay before the requested access is retried is a predetermined parameter based on the replenish rate of the disk access service quota. For example, the delay period is at least greater than the period between replenishments. After the predetermined delay period, the disk access flow controller 210 can compare the current value of the disk access quota and the latency cost of the queued access request again. If the current value of the access quota has been raised to a level at or above the latency cost of the requested access through replenishing, the requested access is carried out immediately. If not, the access request is placed back into the queue 216 and retried after another delay period.

When the requested disk access is executed or forwarded to another server for execution, the disk access flow controller 210 can deduct the latency cost from the current value of the disk access service quota of the virtual disk. In addition, the end location of the completed access is recorded in the disk access log 214. As shown in FIG. 2, the requested disk access can be carried out on one or more physical disks 218 that are locally attached to of the host machine 102. In some implementations, the requested disk access can also be carried out on one or more physical disks 220 that are made available to the host machine 102 by other servers of the cloud-service provider through one or more networks 222.

In some implementations, the disk access manager 202 also includes a disk access service monitor 224. The disk access service monitor 224 can keep track of the utilization levels of the disk access capacities of the physical devices underlying the virtual disks, and adjust the parameters used in the virtual disk throttling.

For example, if the utilization level is consistently at a low level, the disk access service monitor 224 can reduce the "penalty cost" in the formula for calculating the random access cost K. The disk access service monitor 224 can also increase the cap values for the disk service access quotas of the virtual disks. If the processing of requested virtual disk accesses is frequently delayed for lack of disk access service quota, while the overall disk access capacity of the host machines is consistently underutilized, the disk access service monitor 224 can increase the cap values for the disk access service quota for each virtual disk or increase the replenish rates for the disk access service quotas. Therefore, in some implementations, one or more of the predetermined parameters (e.g., the predetermined cap values and replenish rates for the disk access quotas for each virtual disk) used in throttling the virtual disks that are described in this specification can have dynamically-determined values, as long as the values remain stable over specific time periods (e.g., a few hours, one day, or two days) during which competition for the hardware disk access resources by multiple virtual machines remain active and uninterrupted.

FIG. 2 is merely an illustration of how the virtual disk bandwidth can be throttled to avoid the disk access capacity of the physical layer from being overwhelmed by particular virtual disks or virtual machine clients. The disk access management described in this specification can be implemented with fewer or more components than those shown in FIG. 2. In addition, as set forth earlier, some or all of the virtual disk throttling functionalities of the disk access manager 202 described with respect to FIG. 2 can also be implemented in as one or more processes or modules executing in the virtual operating system 136 of each virtual machine 110.

Figure 3:
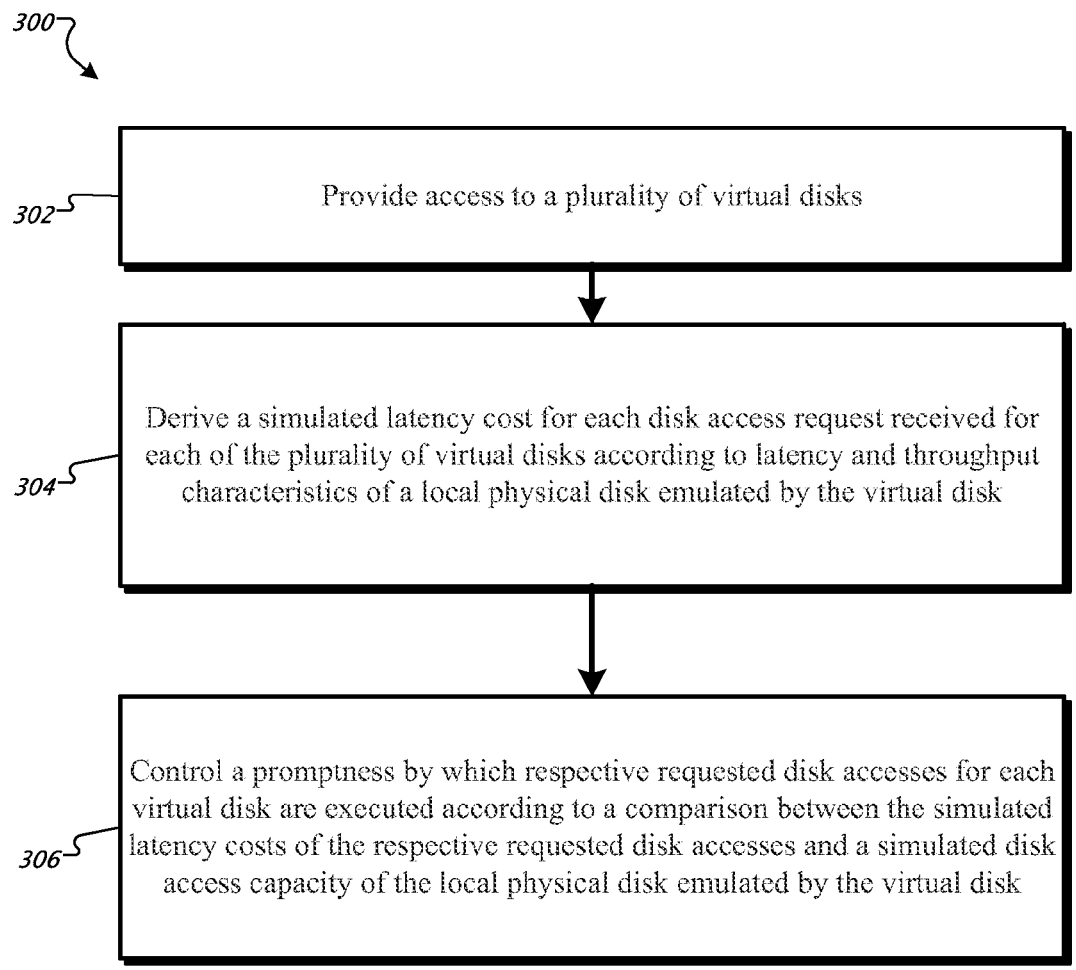
FIG. 3 is a flow diagram of an example process for throttling access to virtual disks according latency and throughput characteristics of physical hard disk drives emulated by the virtual disks.

FIG. 3 is a flow diagram of an example process 300 for throttling virtual disk accesses according latency characteristics of physical hard disk drives. The process 300 can be performed by a host machine of a cloud-service provider, through the disk access manager 202 shown in FIG. 2, for example.

In the example process 300, the host machine provides access to a plurality of virtual disks (302). The plurality of virtual disks are hosted on a plurality of underlying physical storage devices managed by one or more servers. As described in this specification, the host machine derives a simulated latency cost for each disk access request received for each of the plurality of virtual disks according to one or more latency and throughput characteristics of a local physical disk emulated by the virtual disk (304). According to a comparison between the simulated latency costs of the respective requested disk accesses and a simulated disk access capacity of the local physical disk emulated by the virtual disk, the host machine controls the promptness by which respective requested disk accesses for each of the plurality of virtual disks are executed on the plurality of underlying physical storage devices (306).

Figure 4:
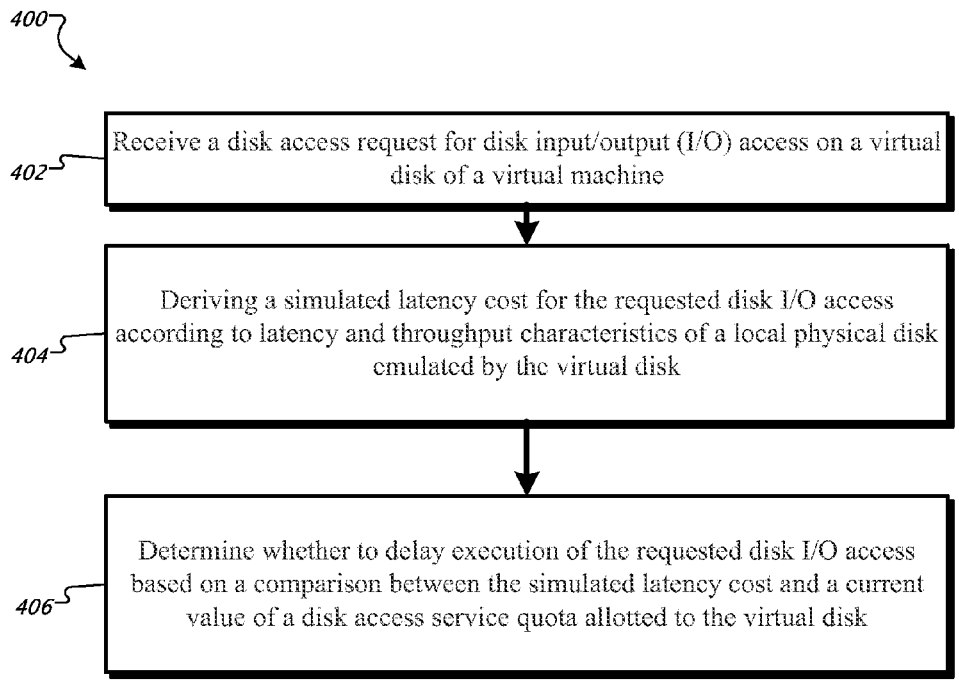
FIG. 4 is a flow diagram of an example process for throttling access to a virtual disk according to latency and throughput characteristics of a physical hard disk drive emulated by the virtual disk.

FIG. 4 is a flow diagram of an example process 400 for throttling access to a virtual disk according to latency characteristics of a physical hard disk drive. The process 400 can be performed by a host machine of a cloud-service provider, through the disk access manager 202 shown in FIG. 2, for example.

In the example process 400, a first disk access request for disk input/output (I/O) access on a virtual disk of a virtual machine is received (402). The virtual disk emulates a local physical disk for the virtual machine. Then, a simulated latency cost is derived for the requested disk I/O access according to one or more latency and throughput characteristics of the local physical disk emulated by the virtual disk (404). The simulated latency cost includes a simulated data transfer latency and a simulated random access latency for carrying out the requested disk I/O access on the local physical disk emulated by the virtual disk. Then, based on a comparison between the simulated latency cost and a current value of a disk access service quota allotted to the virtual disk, it is determined whether execution of the requested disk I/O access is to be delayed (406). As described in this specification, the current value of the disk access service quota is replenished over time. The current value of the disk access service quota is capped at a predetermined cap value. In addition, the current value of the disk access quota is decreased by a respective simulated latency cost of each previous disk access request for the virtual disk when respective requested disk I/O access of the previous disk access request was carried out.

In some implementations, the virtual disk includes logic data blocks that map to physical data blocks distributed among multiple physical storage devices. Requested I/O accesses for multiple disk access requests can be carried out in parallel on the multiple physical storage devices, provided that the current value of the disk access quota is above a sum of respective simulated latency costs of the multiple disk access requests.

Figure 5:
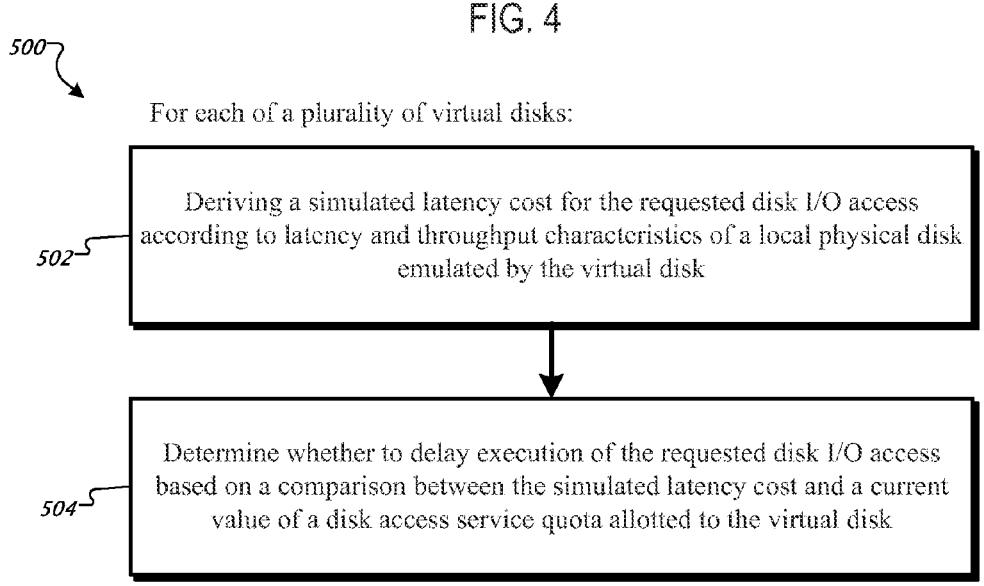
FIG. 5 is a flow diagram of an example process for replenishing the disk access quota allotted to a virtual disk.

FIG. 5 is a flow diagram of an example process 500 for replenishing the disk access quota associated with a virtual disk. In some implementations, the virtual disk is one of a plurality of virtual disks hosted on the multiple physical storage devices. In the example process 500, for each of a plurality of virtual disks: (1) a respective disk access service quota of the virtual disk is incremented according to a predetermined replenish rate associated with the virtual disk until a current value of the respective disk access service quota reaches a respective predetermined cap value associated with the virtual disk (502); and (2) the incrementing is temporarily paused until the current value of the respective disk access service quota of the virtual disk falls below the respective predetermined cap value associated with the virtual disk (504).

Figure 6:
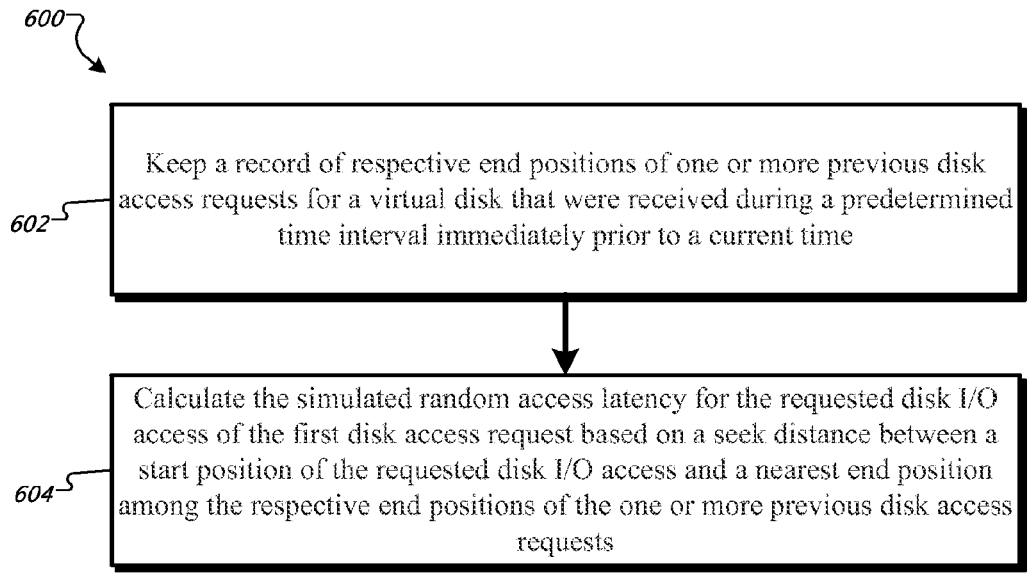
FIG. 6 is a flow diagram of an example process for calculating a simulated random access cost for a requested disk I/O access on a virtual disk.

FIG. 6 is a flow diagram of an example process 600 for calculating a simulated random access latency cost associated with a disk access request.

In the example process 600, the host machine keeps a record of respective end positions of one or more previous disk access requests for the virtual disk that were received during a predetermined time interval immediately prior to a current time (602). Then, the host machine can calculate the simulated random access latency for the requested disk I/O access of the first disk access request based at least on a seek distance between a start position of the requested disk I/O access and a nearest end position among the respective end positions of the one or more previous disk access requests (604).

Figure 7:
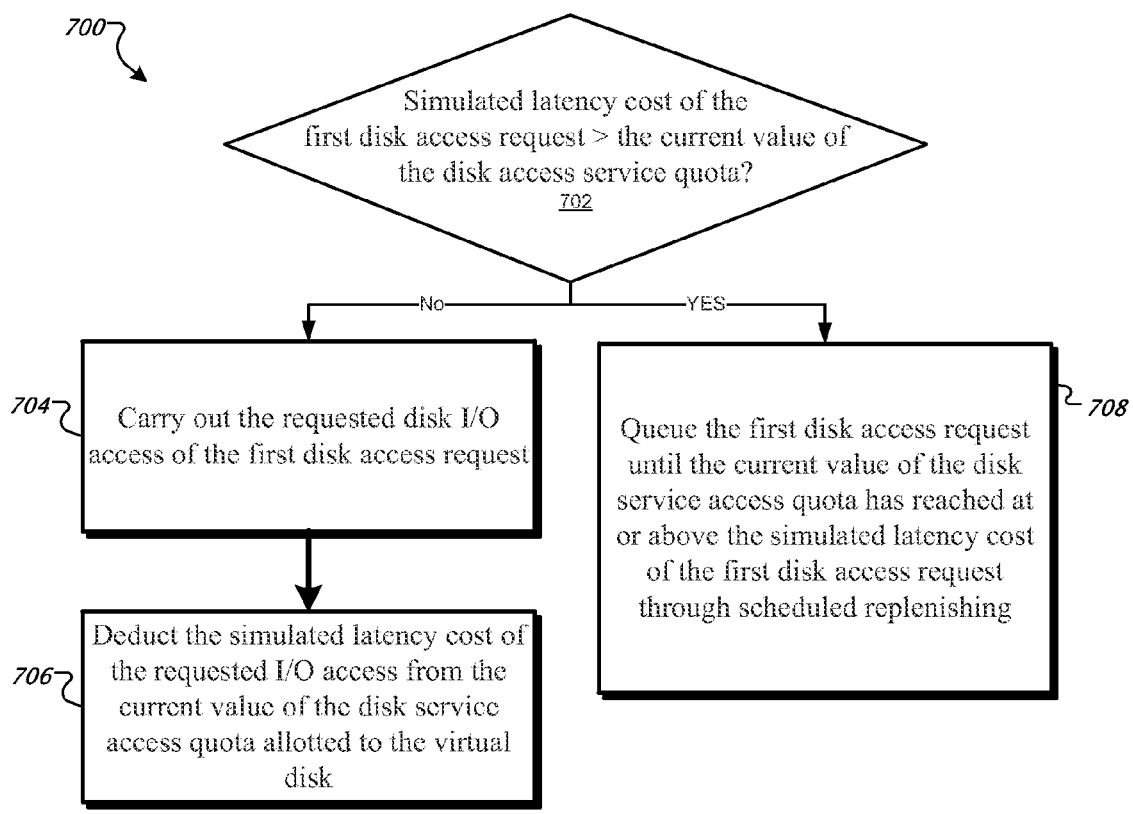
FIG. 7 is a flow diagram of an example process for controlling the timing for executing a requested disk I/O access on a virtual disk based on a comparison between the current value of a disk access service quota associated with the virtual disk and the simulated latency cost of the requested disk I/O access.

FIG. 7 is a flow diagram of an example process 700 for controlling the execution of requested disk access on a virtual disk based on a comparison between the current level of disk access service quota associated with the virtual disk and the simulated latency cost of the disk access request. In the example process 700, upon determination (702) that the simulated latency cost of the first disk access request is at or below the current value of the disk access service quota allotted to the virtual disk, the host machine carries out the requested disk I/O access of the first disk access request (704). In addition, the host machine also deducts the simulated latency cost of the requested I/O access from the current value of the disk service access quota allotted to the virtual disk (706). Upon determination that the simulated latency cost of the first disk access request exceeds the current value of the disk access service quota allotted to the virtual disk, the host machine queues the first disk access request until the current value of the disk service access quota has reached at or above the simulated latency cost of the first disk access request through scheduled replenishing (708).

Figure 8:
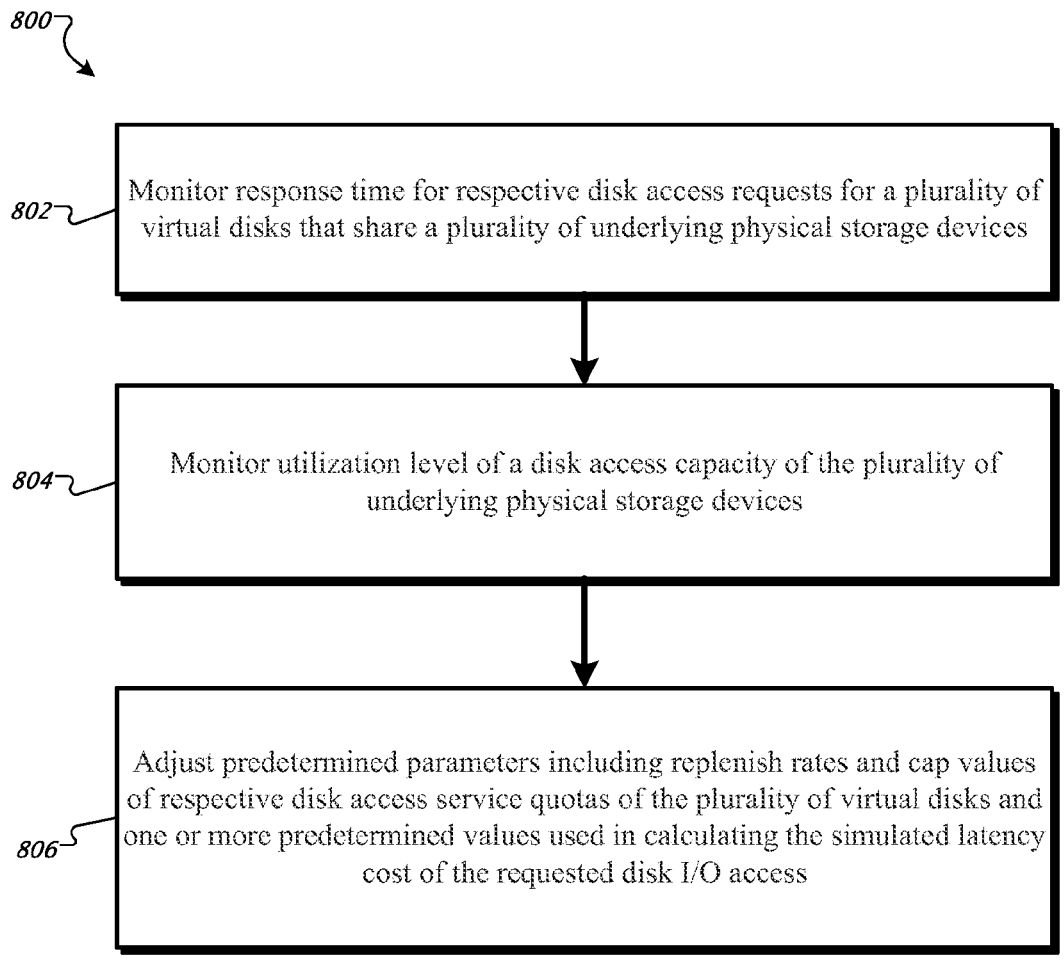
FIG. 8 is a flow diagram of an example process for monitoring access response time for multiple virtual disks supported by multiple physical storage devices and a utilization level of the disk access capacities of the multiple physical storage devices, and adjusting the throttling parameters of the virtual disks based on the monitoring.

FIG. 8 is a flow diagram of an example process 800 for monitoring access response time for multiple virtual disks and a utilization level of the disk access capacities of the plurality of virtual disks, and adjusting the throttling parameters for the virtual disks.

In the example process 800, the host machine monitors response time for respective disk access requests for a plurality of virtual disks that share a plurality of underlying physical storage devices (802). The host machine also monitors utilization level of a disk access capacity of the plurality of underlying physical storage devices (804). The host machine can then adjust one or more of a group of predetermined parameters, the group of predetermined parameters including replenish rates and cap values of respective disk access service quotas of the plurality of virtual disks and one or more predetermined values used in calculating the simulated latency cost of the requested disk I/O access (806).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:

receiving a first disk access request for disk input/output (I/O) access on a virtual disk of a virtual machine, the virtual disk emulating a local physical disk for the virtual machine, wherein the virtual disk includes logical data blocks that map to physical data blocks distributed among multiple physical storage devices, the access by the virtual disk to the multiple physical storage devices being in parallel;

deriving a simulated latency cost for the requested disk I/O access according to one or more latency and throughput characteristics of the local physical disk emulated by the virtual disk, the simulated latency cost including a simulated data transfer latency for carrying out the requested disk I/O access on the local physical disk emulated by the virtual disk and a simulated random access latency for carrying out the requested disk I/O access on the local physical disk emulated by the virtual disk; and determining whether to delay access to one or more of the multiple physical storage devices based on a comparison between the simulated latency cost and a current value of a disk access service quota allotted to the virtual disk, wherein the current value of the disk access service quota is replenished over time, is capped at a predetermined cap value, and is decreased by a respective simulated latency cost of each previous disk access request for the virtual disk when respective requested disk I/O access of the previous disk access request was carried out.

2. The method of claim 1, further comprising:
carrying out requested I/O accesses for multiple disk access requests in parallel on the multiple physical storage devices, provided that the current value of the disk access quota is above a sum of respective simulated latency costs of the multiple disk access requests.

3. The method of claim 1, wherein the virtual disk is one of a plurality of virtual disks hosted on the multiple physical storage devices, and the method further comprises:
for each of the plurality of virtual disks:
incrementing a respective disk access service quota of the virtual disk according to a predetermined replenish rate associated with the virtual disk until a current value of the respective disk access service quota reaches a respective predetermined cap value associated with the virtual disk; and
temporarily pausing the incrementing until the current value of the respective disk access service quota of the virtual disk falls below the respective predetermined cap value associated with the virtual disk.

4. The method of claim 1, further comprising:
keeping a record of respective end positions of one or more previous disk access requests for the virtual disk that were received during a predetermined time interval immediately prior to a current time; and
calculating the simulated random access latency for the requested disk I/O access of the first disk access request based at least on a seek distance between a start position of the requested disk I/O access and a nearest end position among the respective end positions of the one or more previous disk access requests.

5. The method of claim 1, further comprising:
upon determination that the simulated latency cost of the first disk access request is at or below the current value of the disk access service quota allotted to the virtual disk:
carrying out the requested disk I/O access of the first disk access request; and
deducting the simulated latency cost of the requested I/O access from the current value of the disk service access quota allotted to the virtual disk; and
upon determination that the simulated latency cost of the first disk access request exceeds the current value of the disk access service quota allotted to the virtual disk:
queuing the first disk access request until the current value of the disk service access quota has reached at or above the simulated latency cost of the first disk access request through scheduled replenishing.

6. The method of claim 1, further comprising:
monitoring response time for respective disk access requests for a plurality of virtual disks that share a plurality of underlying physical storage devices;
monitoring utilization level of a disk access capacity of the plurality of underlying physical storage devices; and
adjusting one or more of a group of predetermined parameters, the group of predetermined parameters including replenish rates and cap values of respective disk access service quotas of the plurality of virtual disks and one or more predetermined values used in calculating the simulated latency cost of the requested disk I/O access.

7. A computer-implemented method, the method comprising:
providing access to a plurality of virtual disks, the plurality of virtual disks being hosted on a plurality of underlying physical storage devices managed by one or more servers, the access by each of the plurality of virtual disks to the plurality of underlying physical storage devices being in parallel, wherein each virtual disk emulates a local physical disk, and wherein the virtual disk includes logical data blocks that map to physical data blocks distributed among multiple physical storage devices;
deriving a simulated latency cost for each disk access request received for each of the plurality of virtual disks according to one or more latency and throughput characteristics of a local physical disk emulated by the virtual disk, the simulated latency cost including a simulated data transfer latency for carrying out the requested disk I/O access on the local physical disk emulated by the virtual disk and a simulated random access latency for carrying out the requested disk I/O access on the local physical disk emulated by the virtual disk; and
controlling a promptness by which respective requested disk accesses for each of the plurality of virtual disks are executed on the plurality of underlying physical storage devices according to a comparison between the simulated latency costs of the respective requested disk accesses and a simulated disk access capacity of the local physical disk emulated by the virtual disk.

8. A computer storage medium having instructions stored thereon, the instructions, when executed by one or more processors, cause the processors to perform operations comprising:
receiving a first disk access request for disk input/output (I/O) access on a virtual disk of a virtual machine, the virtual disk emulating a local physical disk for the virtual machine, wherein the virtual disk includes logical data blocks that map to physical data blocks distributed among multiple physical storage devices, the access by the virtual disk to the multiple physical storage devices being in parallel;
deriving a simulated latency cost for the requested disk I/O access according to one or more latency and throughput characteristics of the local physical disk emulated by the virtual disk, the simulated latency cost including a simulated data transfer latency for carrying out the requested disk I/O access on the local physical disk emulated by the virtual disk and a simulated random access latency for carrying out the requested disk I/O access on the local physical disk emulated by the virtual disk; and
determining whether to delay access to one or more of the multiple physical storage devices based on a comparison between the simulated latency cost and a current value of a disk access service quota allotted to the virtual disk, wherein the current value of the disk access service quota is replenished over time, is capped at a predetermined cap value, and is decreased by a respective simulated latency cost of each previous disk access request for the virtual disk when respective requested disk I/O access of the previous disk access request was carried out.

9. The computer storage medium of claim 8, wherein the operations further comprise:
carrying out requested I/O accesses for multiple disk access requests in parallel on the multiple physical storage devices, provided that the current value of the disk access quota is above a sum of respective simulated latency costs of the multiple disk access requests.

10. The computer storage medium of claim 8, wherein the virtual disk is one of a plurality of virtual disks hosted on the multiple physical storage devices, and the operations further comprise:
for each of the plurality of virtual disks:
incrementing a respective disk access service quota of the virtual disk according to a predetermined replenish rate associated with the virtual disk until a current value of the respective disk access service quota reaches a respective predetermined cap value associated with the virtual disk; and
temporarily pausing the incrementing until the current value of the respective disk access service quota of the virtual disk falls below the respective predetermined cap value associated with the virtual disk.

11. The computer storage medium of claim 8, wherein the operations further comprise:
keeping a record of respective end positions of one or more previous disk access requests for the virtual disk that were received during a predetermined time interval immediately prior to a current time; and
calculating the simulated random access latency for the requested disk I/O access of the first disk access request based at least on a seek distance between a start position of the requested disk I/O access and a nearest end position among the respective end positions of the one or more previous disk access requests.

12. The computer storage medium of claim 8, wherein the operations further comprise:
upon determination that the simulated latency cost of the first disk access request is at or below the current value of the disk access service quota allotted to the virtual disk:
carrying out the requested disk I/O access of the first disk access request; and
deducting the simulated latency cost of the requested I/O access from the current value of the disk service access quota allotted to the virtual disk; and
upon determination that the simulated latency cost of the first disk access request exceeds the current value of the disk access service quota allotted to the virtual disk:
queuing the first disk access request until the current value of the disk service access quota has reached at or above the simulated latency cost of the first disk access request through scheduled replenishing.

13. The computer storage medium of claim 8, wherein the operations further comprise:
monitoring response time for respective disk access requests for a plurality of virtual disks that share a plurality of underlying physical storage devices;
monitoring utilization level of a disk access capacity of the plurality of underlying physical storage devices; and
adjusting one or more of a group of predetermined parameters, the group of predetermined parameters including replenish rates and cap values of respective disk access service quotas of the plurality of virtual disks and one or more predetermined values used in calculating the simulated latency cost of the requested disk I/O access.

14. A system, comprising:
one or more processors; and
memory having instructions stored thereon, the instructions, when executed by the one or more processors, cause the processors to perform operations comprising:
receiving a first disk access request for disk input/output (I/O) access on a virtual disk of a virtual machine, the virtual disk emulating a local physical disk for the virtual machine, wherein the virtual disk includes logical data blocks that map to physical data blocks distributed among multiple physical storage devices, the access by the virtual disk to the multiple physical storage devices being in parallel;
deriving a simulated latency cost for the requested disk I/O access according to one or more latency and throughput characteristics of the local physical disk emulated by the virtual disk, the simulated latency cost including a simulated data transfer latency for carrying out the requested disk I/O access on the local physical disk emulated by the virtual disk and a simulated random access latency for carrying out the requested disk I/O access on the local physical disk emulated by the virtual disk; and
determining whether to delay access to one or more of the multiple physical storage devices based on a comparison between the simulated latency cost and a current value of a disk access service quota allotted to the virtual disk, wherein the current value of the disk access service quota is replenished over time, is capped at a predetermined cap value, and is decreased by a respective simulated latency cost of each previous disk access request for the virtual disk when respective requested disk I/O access of the previous disk access request was carried out.

15. The system of claim 14, wherein the operations further comprise:
carrying out requested I/O accesses for multiple disk access requests in parallel on the multiple physical storage devices, provided that the current value of the disk access quota is above a sum of respective simulated latency costs of the multiple disk access requests.

16. The system of claim 14, wherein the virtual disk is one of a plurality of virtual disks hosted on the multiple physical storage devices, and the operations further comprise:
for each of the plurality of virtual disks:
incrementing a respective disk access service quota of the virtual disk according to a predetermined replenish rate associated with the virtual disk until a current value of the respective disk access service quota reaches a respective predetermined cap value associated with the virtual disk; and
temporarily pausing the incrementing until the current value of the respective disk access service quota of the virtual disk falls below the respective predetermined cap value associated with the virtual disk.

17. The system of claim 14, wherein the operations further comprise:
keeping a record of respective end positions of one or more previous disk access requests for the virtual disk that were received during a predetermined time interval immediately prior to a current time; and
calculating the simulated random access latency for the requested disk I/O access of the first disk access request based at least on a seek distance between a start position of the requested disk I/O access and a nearest end position among the respective end positions of the one or more previous disk access requests.

18. The system of claim 14, wherein the operations further comprise:
upon determination that the simulated latency cost of the first disk access request is at or below the current value of the disk access service quota allotted to the virtual disk:
carrying out the requested disk I/O access of the first disk access request; and
deducting the simulated latency cost of the requested I/O access from the current value of the disk service access quota allotted to the virtual disk; and
upon determination that the simulated latency cost of the first disk access request exceeds the current value of the disk access service quota allotted to the virtual disk:
queuing the first disk access request until the current value of the disk service access quota has reached at or above the simulated latency cost of the first disk access request through scheduled replenishing.

19. The system of claim 14, wherein the operations further comprise:
monitoring response time for respective disk access requests for a plurality of virtual disks that share a plurality of underlying physical storage devices;
monitoring utilization level of a disk access capacity of the plurality of underlying physical storage devices; and
adjusting one or more of a group of predetermined parameters, the group of predetermined parameters including replenish rates and cap values of respective disk access service quotas of the plurality of virtual disks and one or more predetermined values used in calculating the simulated latency cost of the requested disk I/O access.

\* \* \* \* \*